(12) United States Patent
Schmeink et al.

(10) Patent No.: US 7,287,950 B2
(45) Date of Patent: Oct. 30, 2007

(54) TRANSFER ARRANGEMENT AND METHOD

(75) Inventors: Martin Schmeink, Salach (DE);
Andreas Lauke, Gruibingen (DE);
Gerd Jäger, Bad Überkingen (DE);
Hans Hofele, Göppingen (DE); Karl Thudium, deceased, late of Wäschenbeuren (DE); by Claudia Maria Thudium, legal representative, Wäschenbeuren (DE); Andreas Dangelmayr, Ottenbach (DE)

(73) Assignee: Schuler Pressen GmbH & Co. KG, Göppingen (DE)

( * ) Notice: Subject to any disclaimer, the term of this patent is extended or adjusted under 35 U.S.C. 154(b) by 226 days.

(21) Appl. No.: 11/101,148

(22) Filed: Apr. 7, 2005

(65) Prior Publication Data

US 2005/0238473 A1 Oct. 27, 2005

(30) Foreign Application Priority Data

Apr. 8, 2004 (DE) ...................... 10 2004 018 059

(51) Int. Cl.
*B25J 5/02* (2006.01)
(52) U.S. Cl. .................. 414/749.1; 100/207; 212/224; 414/917; 901/15

(58) Field of Classification Search ............. 414/749.1, 414/591, 917; 212/224; 100/207; 901/15
See application file for complete search history.

(56) References Cited

U.S. PATENT DOCUMENTS

| | | | | |
|---|---|---|---|---|
| 4,319,864 A | * | 3/1982 | Kaufeldt ................... | 414/751.1 |
| 5,520,502 A | * | 5/1996 | Liljengren et al. ........ | 414/751.1 |
| 5,993,143 A | * | 11/1999 | Eltze et al. .............. | 414/752.1 |
| 6,471,504 B1 | * | 10/2002 | Matsui ....................... | 425/556 |

FOREIGN PATENT DOCUMENTS

| | | |
|---|---|---|
| DE | 195 06 518 | 8/1996 |
| DE | 195 21 976 | 12/1996 |
| DE | 43 10 057 | 9/2004 |

* cited by examiner

*Primary Examiner*—Donald Underwood
(74) *Attorney, Agent, or Firm*—Klaus J. Bach

(57) ABSTRACT

In a transfer arrangement and method for transferring a workpiece between first and second spaced locations along a guide rail with a carriage movably supported on the guide rail, a transfer arm is pivotally supported on the carriage and carries at its free end a workpiece holder which is accelerated by the carriage with the arm essentially stretched out in the movement direction out of, and decelerated into, the end positions, and, in an intermediate position, the carriage movement is slowed down or even reversed while the workpiece holder is moved along by a pivot movement of the arm.

17 Claims, 11 Drawing Sheets

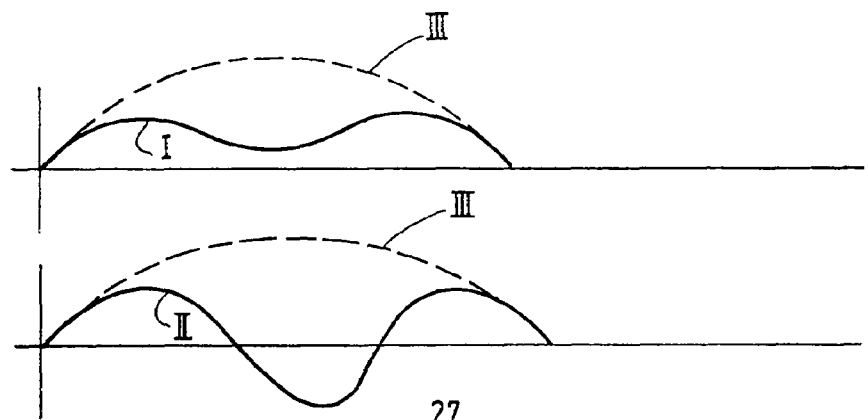
Fig.17
Fig.18
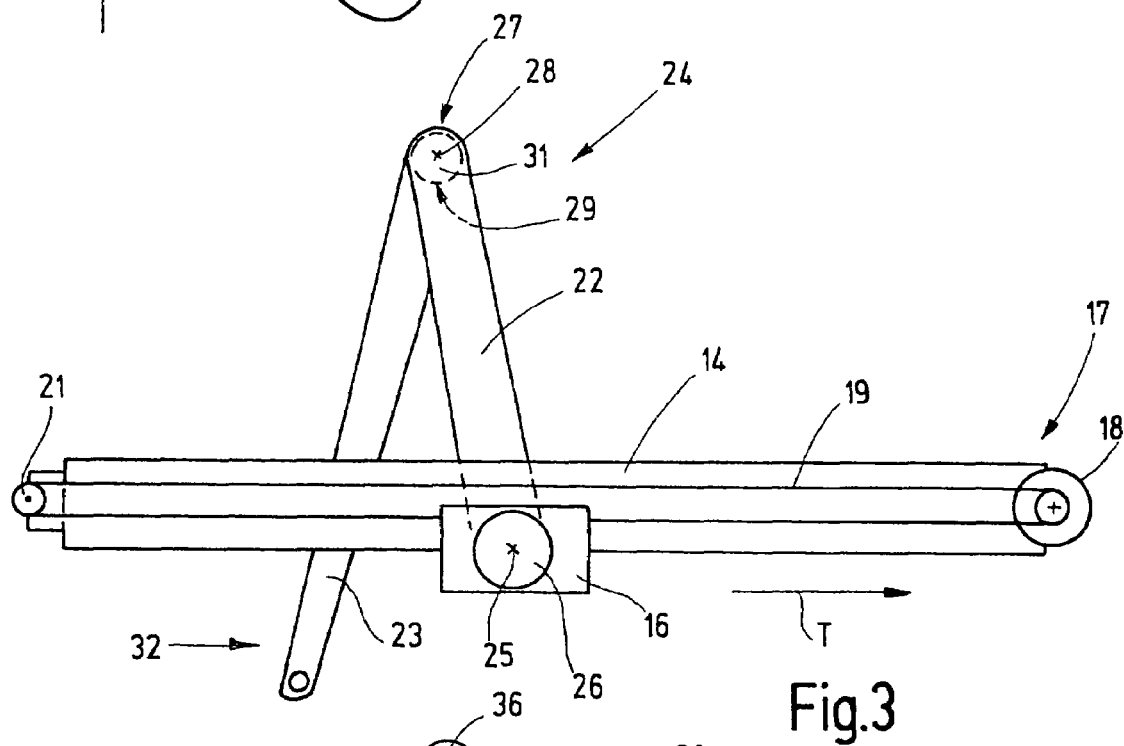
Fig.3
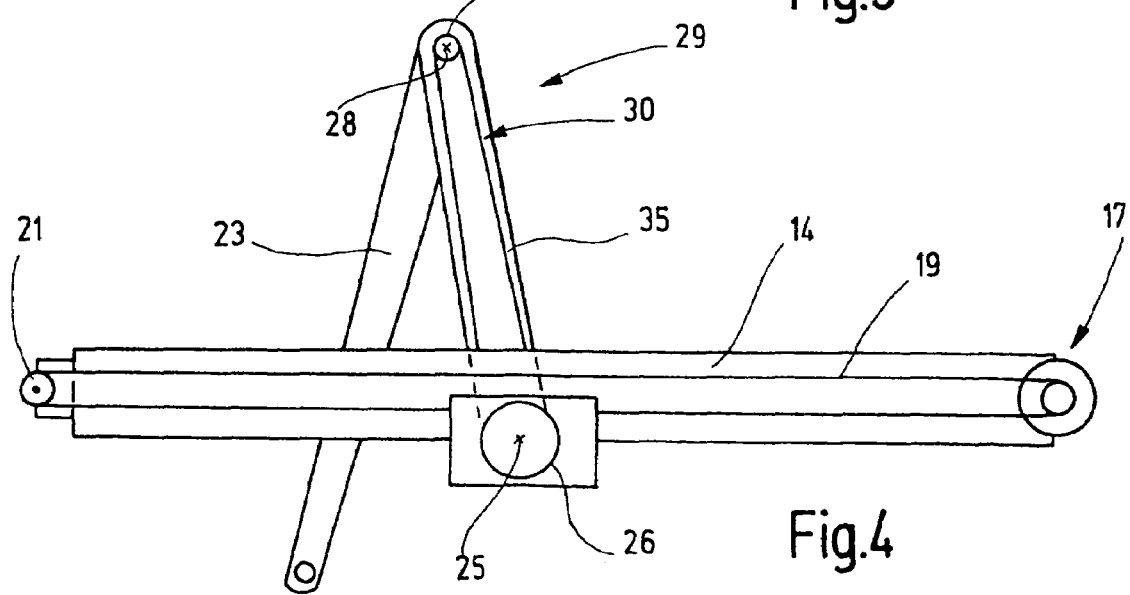
Fig.4

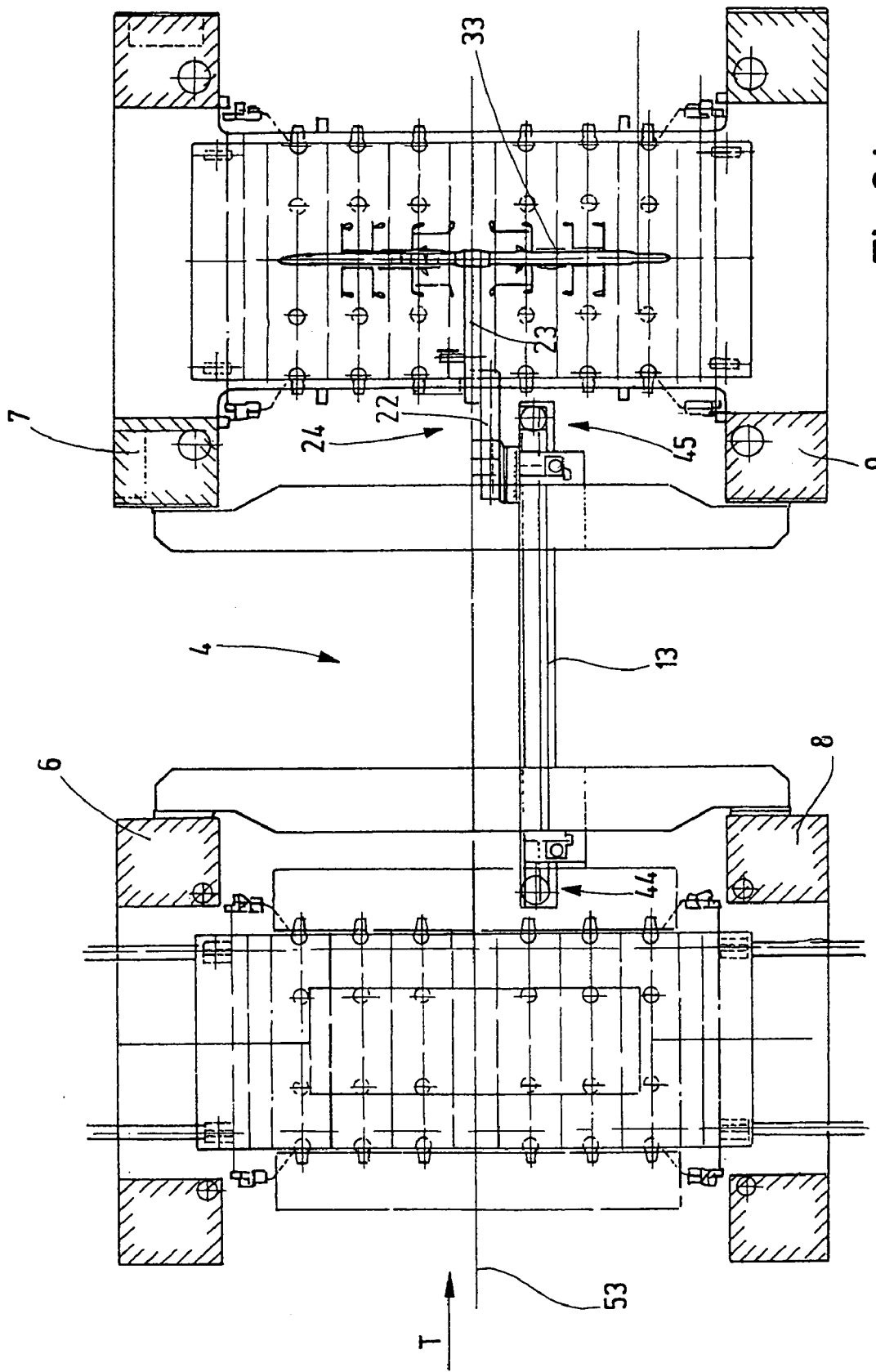

TRANSFER ARRANGEMENT AND METHOD

BACKGROUND OF THE INVENTION

The invention relates to a transfer arrangement, particularly for a transfer press and to a method for transporting workpieces by means of a transfer arrangement including a guide track on which a carriage is movably supported.

The transport of workpieces between individual presses has been mechanized for some time in connection with different press installations, workpiece conveyor lines from press-to-press and similar devices. Particularly for presses arranged closely adjacent one another and for the handling of smaller sheet metal parts, so-called gripper track transfer equipment has been used as shown for example in DE 43 10 057 A1. With this kind of equipment, the workpieces are transferred by means of two parallel gripper rails which are moved in the rhythm of the presses so that one is moved toward and below the workpiece on other gripper rails and then raised to support the workpiece and then, with the workpiece supported thereon is moved away from the other gripper rails, and then again downwardly to deposit the workpiece on another set of rails or other support device. During the press stroke, the gripper rails are again returned to the start-out position.

The transport of larger sheet metal parts is facilitated by the so-called suction transfer devices as they are described in DE 195 06 518 A1. They include suction bridges which are arranged transverse to the transport direction and are supported at their two ends by carriages disposed on guide rails. Raising and lowering of the guide rails results in raising and lowering the suction bridges and consequently the workpieces. For moving the suction bridges, so-called push rods are provided on the guide rails which are operated by electric motors.

For individual presses which are to be interlinked and which are set up at a certain distance from each other, transfer arrangements are known which operate individually between two press stages. DE 195 21 976 A1, for example, discloses in one of the shown embodiments a transfer arrangement which includes a vertically adjustable carriage. The carriage is provided with a parallelogram-arm structure at the lower end of which a two-element pivot arm is arranged. The pivot arm may have vertical or horizontal pivot joint axes. In the arrangement with a horizontal pivot axis, the parallelogram arm structure operates like a pendulum. The arm can be extended in one direction toward an upstream workpiece or in another direction toward a downstream workpiece. The joints pivot in the process about a horizontal axis.

With such a drive arrangement, large distances between presses can be bridges and the transfer of the workpieces can be arranged to be reasonably flexible. For example, the distances between the presses of a transfer set up do not need to be uniform.

The height required for the pivot movement is substantial. This means that the tools must be opened wide to permit the pivot movement of the arms. To overcome this disadvantage arms with vertical pivot axes are disclosed in the same reference. Such arrangements however, with long arms, suffer from bearing inaccuracies resulting in inaccurate positioning of the workpieces.

Furthermore, the power required for the transport of the workpieces and the movement of the arms and the engagement structures must be provided by pivot drives which require high torques. If the drives are positioned at the various joints of the arms, these drives must be relatively large in order to generate the required torques and they too must be moved.

It is therefore the object of the present invention to provide an improved transfer arrangement and method of operating such a transfer arrangement.

SUMMARY OF THE INVENTION

In a transfer arrangement and method for transferring a workpiece between first and second spaced locations along a guide rail with a carriage movably supported on the guide rail, a transfer arm is pivotally supported on the carriage and carries at its free end a workpiece holding means which is accelerated by the carriage, with the arm essentially stretched out in the movement direction, out of, and decelerated into, the end positions, and, in an intermediate portion, the carriage movement is slowed down or even reversed while the workpiece holder is moved along by pivot movement of the arm.

The transfer arrangement according to the invention includes a guide rail and a carriage supported thereon so as to be movable along the guide rail. On the carriage, a preferably two-element arm is supported which can be pivoted in the transport direction and opposite thereto. Its upper member, which is connected to the carriage, is pivotable by 180°. Its lower member, which is connected to the support device, is pivotable preferably in the opposite direction by 360°. A control arrangement at least for controlling the carriage drive can cause the arm with support device to extend in its stretched state to move into the at least partially open tools. In this way, a certain relatively small plunger opening is sufficient for the insertion and for the removal of the workpiece. In other words, with an approximately sinus-shaped plunger movement, a large part of the plunger stroke and consequently a relatively long time span can be used for the workpiece transport. The pivoting of the arm from the rearwardly oriented to the forwardly oriented position does not occur in synchronism with the forward movement of the carriage but basically, is concentrated within an available pivot volume or operating space between the presses or plungers of adjacent tools. The control unit controls the carriage in such a way that, during pivoting of the arm, the carriage is at least slowed down but preferably moves backwardly for a short distance. This is energetically advantageous. The carriage and the carriage drive which is preferably stationary can be used in this way to accelerate the essentially stretched arm and the workpiece held thereby out of the tool. The pivot drives of the arm then only need to provide the force required to hold the arm in a stretched state that is, they only must accommodate the weight force. When the arm and the workpiece have been accelerated by the carriage, they can continue to move in the direction of acceleration while the strong carriage drive moves the carriage in the opposite direction or at least decelerates the carriage while the pivot drives then operate the pivot movements of the arm joints. The movement of the carriage in the opposite direction supports the movement of the pivot drives. When the arm is again stretched, the carriage can than again be moved forward to insert the workpiece into the open adjacent press. Little space is needed for that procedure. The retarding energy is again provided solely by the carriage drive, not by the pivot drives.

As a result, the carriage drive provides most of the power needed for the transfer of the workpieces. It can be large and rugged. Its weight is of no consideration since it is stationary. The pivot drives on the other hand do not need to be powerful so that the moving parts of the transfer arrangement, that is, the arms and the parts supported thereby can be very lightweight.

The transport arrangement described so far can move very rapidly because of the energetic and power-based optimization. If the workpiece support structure, (the suction bridge) is introduced into the tool and removed therefrom with the arms essentially stretched, the transfer arrangement requires, as initially mentioned, only a small opening of the tool for the insertion of the workpiece. A large press angle (corresponding to the stroke of the press drive) can therefore be utilized for the transport of the workpiece. Both advantages combine to permit the provision of a modular transport arrangement which is lightweight and can be activated rapidly so that high press stroke rates can be achieved.

The invention will become more readily apparent from the following description thereof on the basis of the accompanying drawings.

BRIEF DESCRIPTION OF THE DRAWINGS

FIG. 3 shows the transfer arrangement of FIG. 2 in a schematic side view, FIG. 4 shows an alternative embodiment of the transfer arrangement in a schematic side view, FIGS. 17 and 18 show two alternative movement diagrams for the carriage of the transfer arrangement indicating the carriage speed and the support structure speeds, FIG. 24 shows the presses of FIG. 23 in a horizontal cross-sectional view.

DESCRIPTION OF PREFERRED EMBODIMENT

Figure 1:
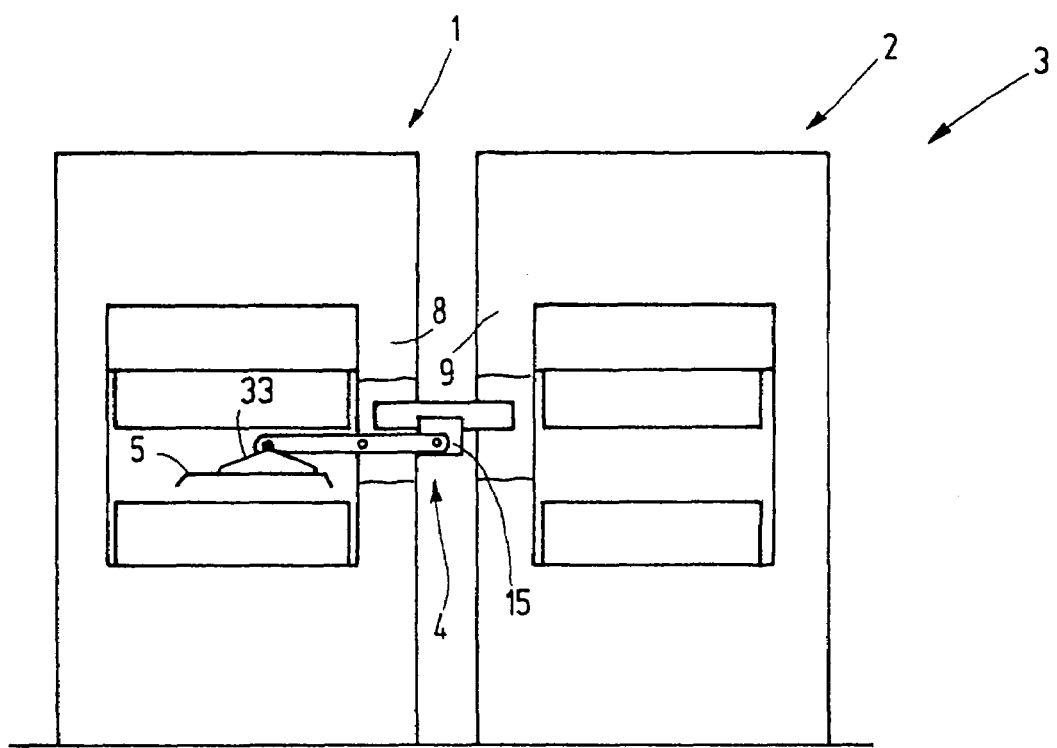
FIG. 1 shows schematically two presses interconnected by a transfer arrangement according to the invention.

FIG. 1 shows an arrangement of two presses 1, 2 of a setup of presses 3 which are interconnected by a workpiece transfer system. The workpiece transfer system comprises individual transfer arrangements of which one transfer arrangement 4 is schematically shown in FIG. 1. It is used for transferring metal sheet workpieces 5 from the press 1 to the press 2. The transfer arrangement 4 can be used, as shown, for the interconnection of individual presses or for the transport of workpieces n hybrid press installations or in transfer presses. The transfer arrangement 4 is shown separately in FIG. 2. It is arranged between adjacent columns 6, 7, 8, 9 of the adjacent presses 1, 2. Spaced parallel guide rails 13, 14 are supported on, or between, the columns 6, 7, and 8, 9 and beams 11, 12 extend transverse to the transport direction T. Guide carriages 15, 16 (FIGS. 1 and 2) are supported on the guide rails 13, 14 so as to be movable in the transport direction T. Although it would be possible in principle to use arc-like curved guide rails 14 straight guide rails 13, 14 are preferred. The two carriages 15, 16 are arranged in a mirror-reversed manner relative to each other. They form, together with other elements, symmetrical transfer components which are movable synchronously in order to tilt workpieces in a predetermined way.

Below, the transfer component group connected to the guide rail 14 and the carriage 16 will be described. This description also applies to the opposite transfer arrangement which is disposed on the guide rail 13 and the carriage 15. For that reason, the same reference numerals are used.

As shown particularly in FIGS. 3 and 4, the arrangement includes a carriage drive 17 for the carriage 16 capable of moving the carriage 16 back and forth in the transport direction T. The carriage drive 17 may be a stationary servo motor 18 as symbolically indicated in the figures which, via a pull member 19 such as a toothed belt, is connected to the carriage 16. With the servomotor 18 preferably mounted at one end of the guide rail 14, a redirecting roller 21 is provided at the opposite end of the guide rail around which the pull member 19 extends. Alternatively, a gear rack drive arrangement may be provided with the servomotor arranged on the carriage 16 and the gear rack being stationary and mounted on the guide rail 14, a screw spindle drive with a threaded nut disposed on the carriage 16 and extending along the guide rail 14 and connected at one end to the servomotor 18, or another linear drive including a position-controlled hydraulic drive for driving the carriage 16. The carriage 16 can be driven, particularly in the latter case, by way of hydraulic or pneumatic cylinders without piston rods.

The carriage carries an arm 24 comprising two elements 22, 23 and is supported on the carriage 16 pivotally about a pivot axis 25. Pivot movement of the arm 24 is provided for by a drive motor 26 or another controlled drive mounted on the carriage 16. The drive motor 26 determines the pivot positions of the element 22 of the arm 24.

The elements 22, 23 of the arm 24 are joined by a pivot joint 27 whose pivot axis 28 extends parallel to the pivot axis 25 of the arm 22 that is in a direction transverse to the transport direction T. The pivot axis 28 and the pivot axis 25 extend preferably horizontally. It is pointed out however, that the pivot axis 25 and the pivot axis 28 may be vertically or otherwise oriented, any orientation being within the scope of the present invention.

Figure 2:
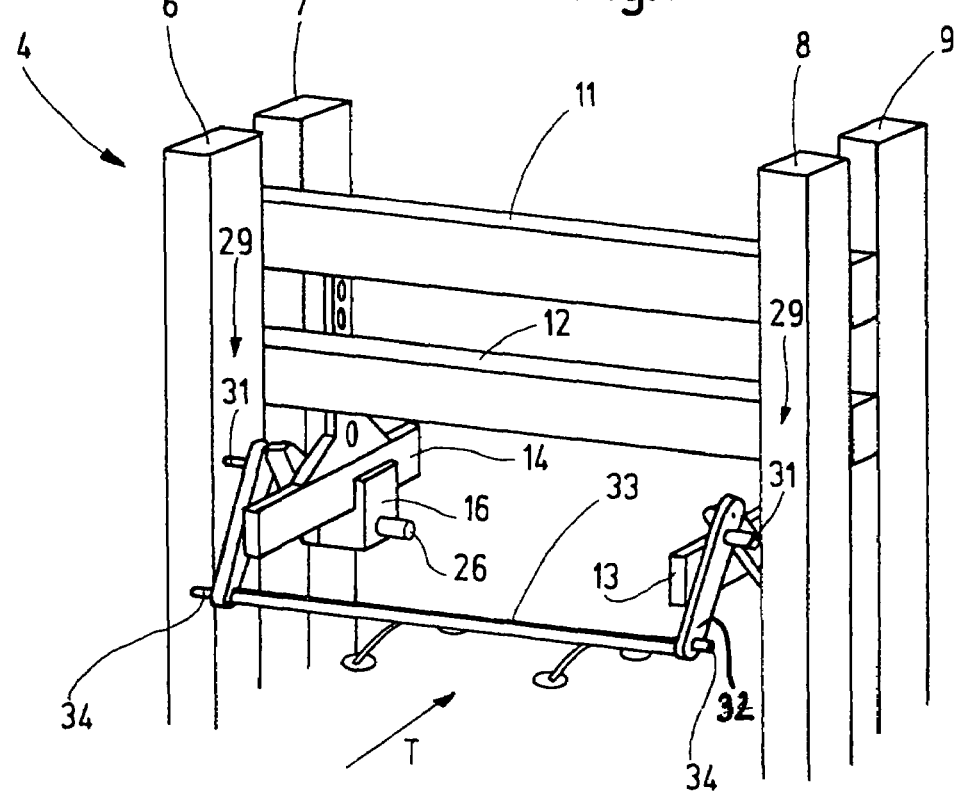
FIG. 2 shows the transfer arrangement according to FIG. 1 in a schematic perspective view.

The joint 27 is provided with a joint drive 29, which, in the embodiments shown in FIGS. 2 and 3, is a servomotor 31 as indicated in FIG. 3. In this way, the element 23 can be pivoted independently of the pivot movement of the element 22.

The element 23 is in all embodiments somewhat longer than the element 22. As a result, its lower end reaches below the carriage 16. It is connected to an attachment device for carrying a suction bridge 33—see FIG. 2—which serves as support means for the transport of the sheet metal parts 5 (FIG. 1). Another servomotor 34 schematically indicated in FIG. 2 at the lower end 32 of the lower element 23 is adapted to rotate the suction bridge 33 about its axis transverse to the transport direction T. In this way, the sheet metal workpiece 5 can be kept in a horizontal orientation during pivoting of the arm 24 and the workpiece can be tilted into any desired position.

The description provided above applies equally to the embodiment of FIG. 4. Other than in FIG. 3, however, the drive 29 for the joint 36 is not provided by a motor arranged at the joint but a drive structure 30 including for example a toothed belt sprocket wheel mounted on the carriage 16 concentrically with the pivot axis 25 so as to be stationary and over which a toothed belt 35 extends. The toothed belt 35 extends around a smaller toothed sprocket 36 which is firmly connected to the element 23 and is concentric with the pivot axis 28. With this arrangement, pivoting of the element 22 about the pivot axis 25 results at the same time in an opposite pivotal movement of the element 23 in an opposite sense at a transmission ratio depending on the relative sizes of the sprocket wheels.

The transfer arrangement described so far is controlled by a control arrangement which is described below on the basis of its operation. Under the control of the control arrangement, the transfer arrangement 4 operates as follows:

In the FIGS. 5 to 16, various movement states of the transfer arrangement during a completion of a transfer stroke are shown schematically as to the kinematics thereof.

Figure 5:
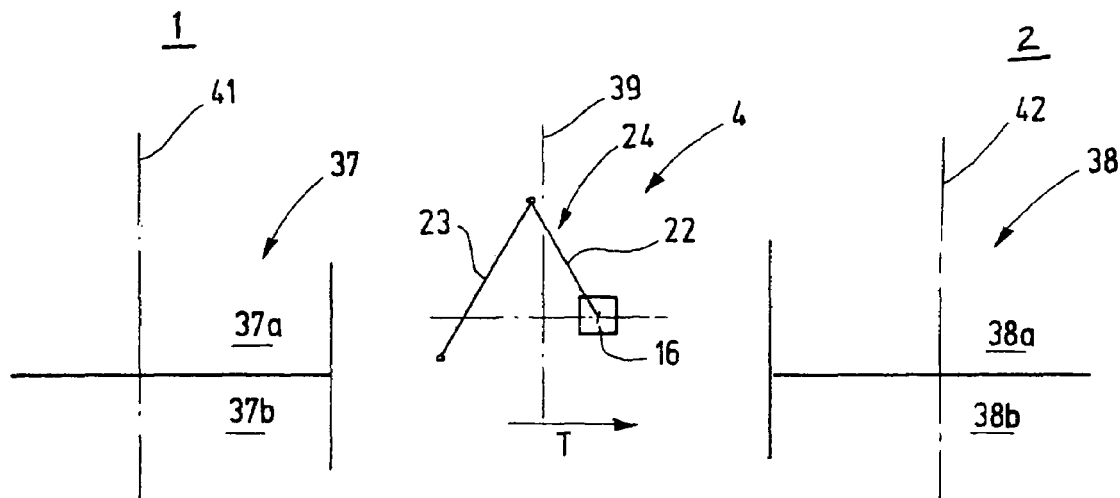
FIGS. 5 to 16 show the transfer arrangement according to the invention in various operating states.
Figure 19:
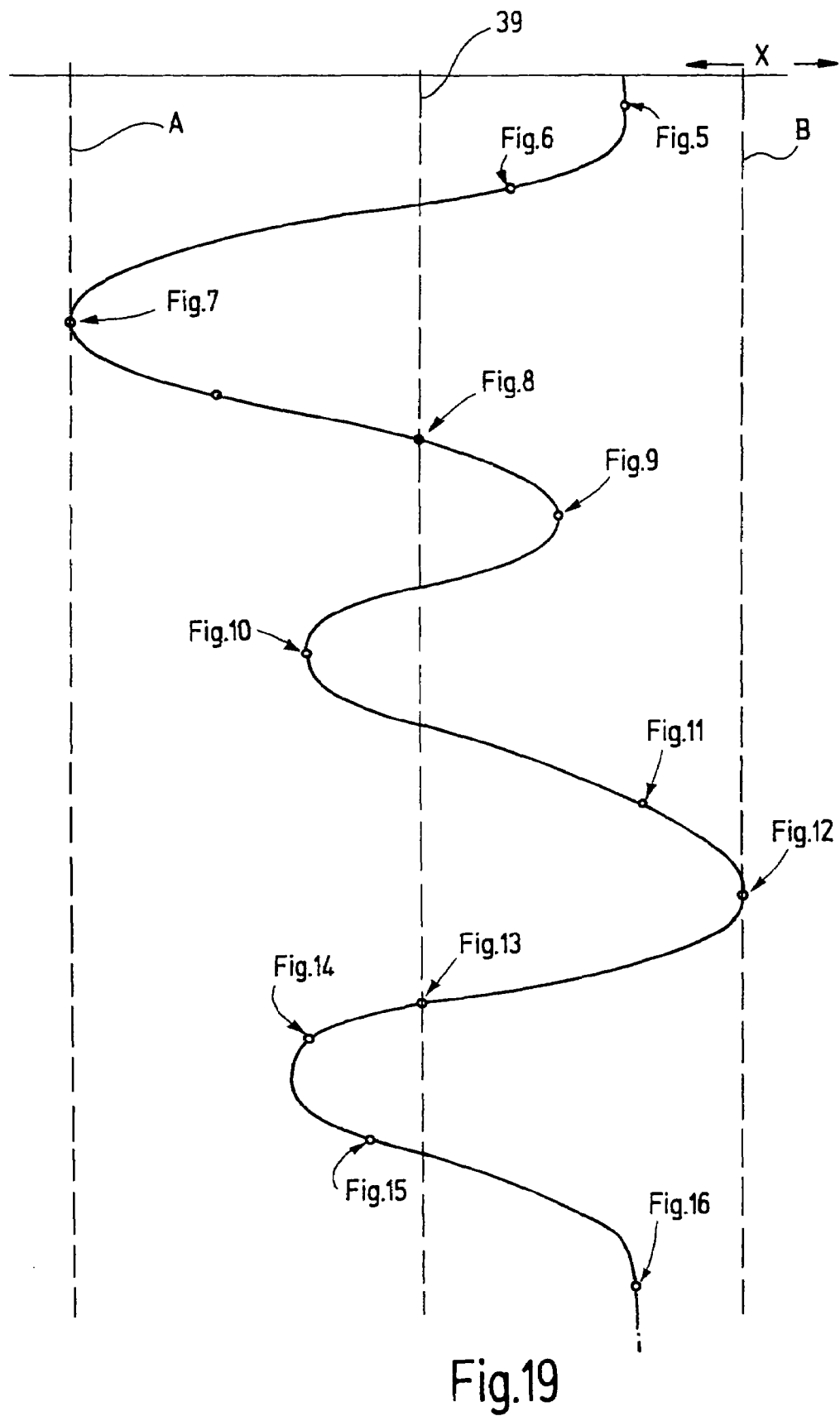
FIG. 19 shows diagrammatically the locations of the transfer arrangement over time.

In FIG. 5, the transfer arrangement 4 is shown in a rest position. The tools 37, 38 of the two adjacent presses 1 and 2 are closed, that is, the respective top parts 37*a*, 38*a*, are disposed on the bottom parts 37*b*, 38*b* of the respective presses. In the rest position, the carriage 16 is disposed closer to the tool 38 than to the tool 37. A workpiece is to be transferred from the tool 37 to the tool 38. The arm 24 is angled toward the tool 37. The element 22 extends upwardly at a relatively steep angle whereas the element 23 is angled downwardly toward the tool 37. The position represents the start-out position for the subsequent transfer cycle. In FIG. 19, the carriage position along the guide rail 14 (x-direction) is shown depending on time. For the situation as shown in FIG. 5, the carriage 16 is positioned on the right of a center line 39 disposed in the center between the centers 41, 42 of the tools. The tool center lines 41, 42 represent the center of the workpiece 5 and the end of the arm 24 at the starting and the end points.

Figure 6:
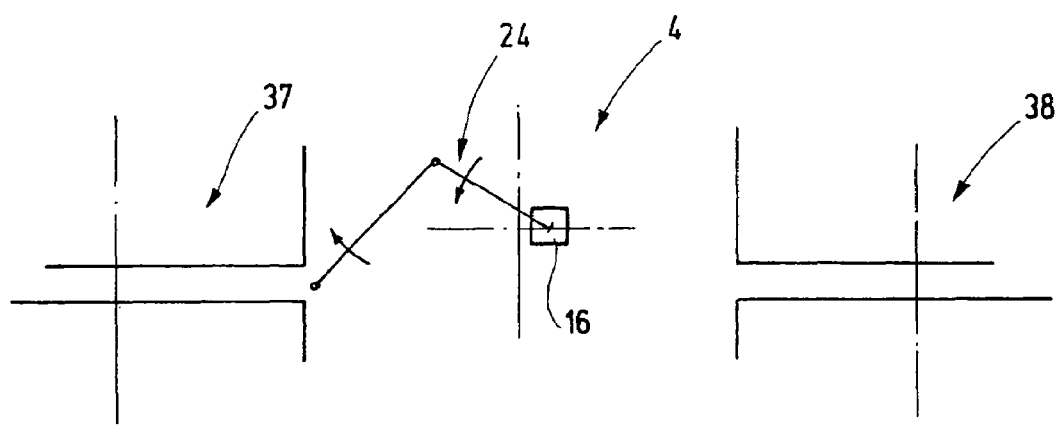
Figure 7:
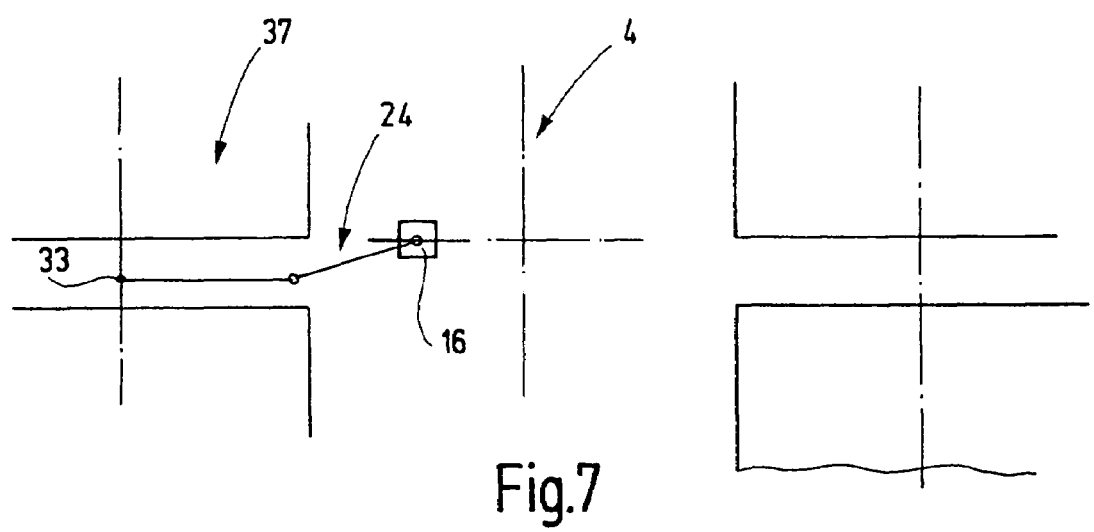

After completion of a press stroke, the tools 37, 38 are being opened as indicated in FIG. 6. The servomotors 18, 31 controlling the arm 24 are beginning to stretch the arm 24 as shown in FIG. 6. At the same time, the carriage 16 starts to move toward the tool 37. This carriage movement is indicated in FIG. 19 by the reference to FIG. 6.

When the tool 37 is sufficiently opened, the transfer arrangement 4 with the suction bridge 33 can move into the tool 37. During change of the positions of the arm 24 and the carriage 16 from those shown in FIG. 6 to those shown in FIG. 7, first the arm 24 is stretched and then the carriage 16 is moved to its end position closest to the tool 27 (line A in FIG. 19). Line A marks the start-out point A for the transfer movement of the carriage 16 in the transfer step. In this position, the workpiece 5 is picked up by shortly lowering the arm 24 and then raising it again.

Figure 8:
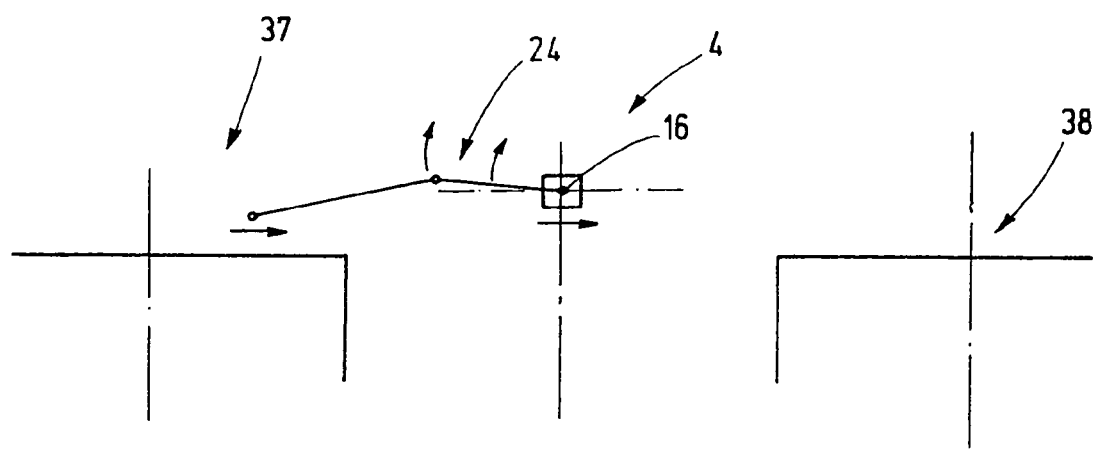

FIG. 8 discloses the transfer arrangement wherein the arm 24 is slightly raised but still stretched. As indicated by the arrow, the carriage 16 is moving at full speed toward the tool 38 after having accelerated the carriage 16, the arm 24 and the workpiece 5 together with the suction bridge 33 toward the tool 38. This acceleration is accomplished essentially by the carriage drive motor 18—without any contribution by the other motors. The speed of the carriage 16 on its way from the left extreme end position (line A in FIG. 19) toward its right end position (line B in FIG. 19) is shown in FIGS. 17 and 18 for different embodiments. The line B represents the end point for the carriage movement during the transfer of the workpiece to the tool 38. The carriage is accelerated in either case, that is following the curve I as well as the curve II, from the speed zero to a positive speed value, whereby the workpiece 5 reaches so to say "travel speed".

Figure 9:
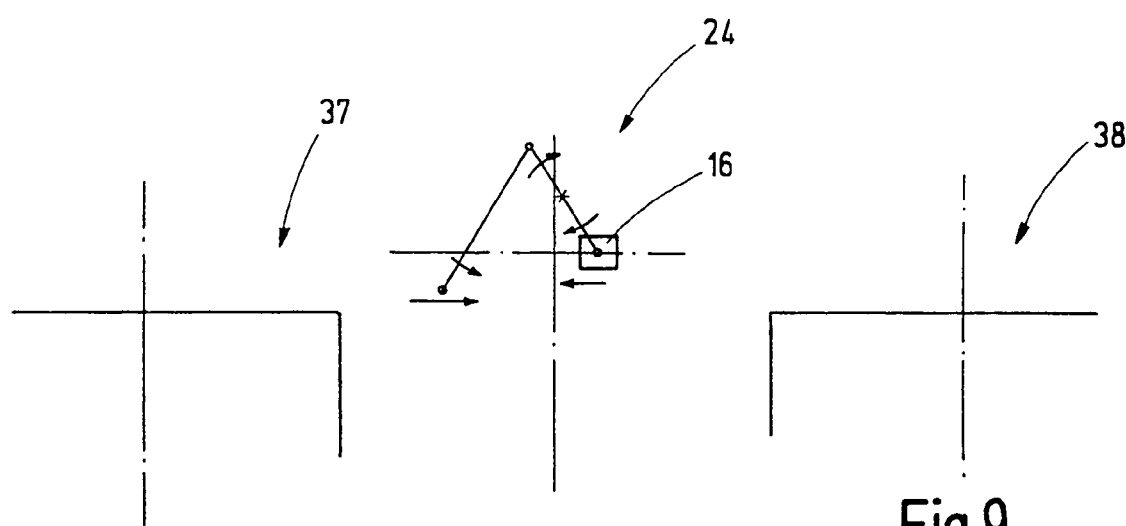

After the acceleration phase with the arm 24 essentially stretched the carriage 16 reaches the position shown if FIG. 9 and specifically marked in FIG. 19 in which the carriage 16 stops and is then accelerated in the opposite direction while the workpiece 5 with the arm element 23 continues to move toward the tool 38. The arm 24 is moved in this process from the position shown in FIG. 9 over to the position shown in FIG. 10 toward the tool 38. The servomotors 26, 31 which cause the pivot movements of the elements 22, 23 require only small drive moments for this movement since the workpiece and the suction device have already been accelerated by the carriage 16 and the carriage is now moving in the opposite direction. The servo motors 26, 31 can therefore be relatively small and lightweight.

Figure 10:
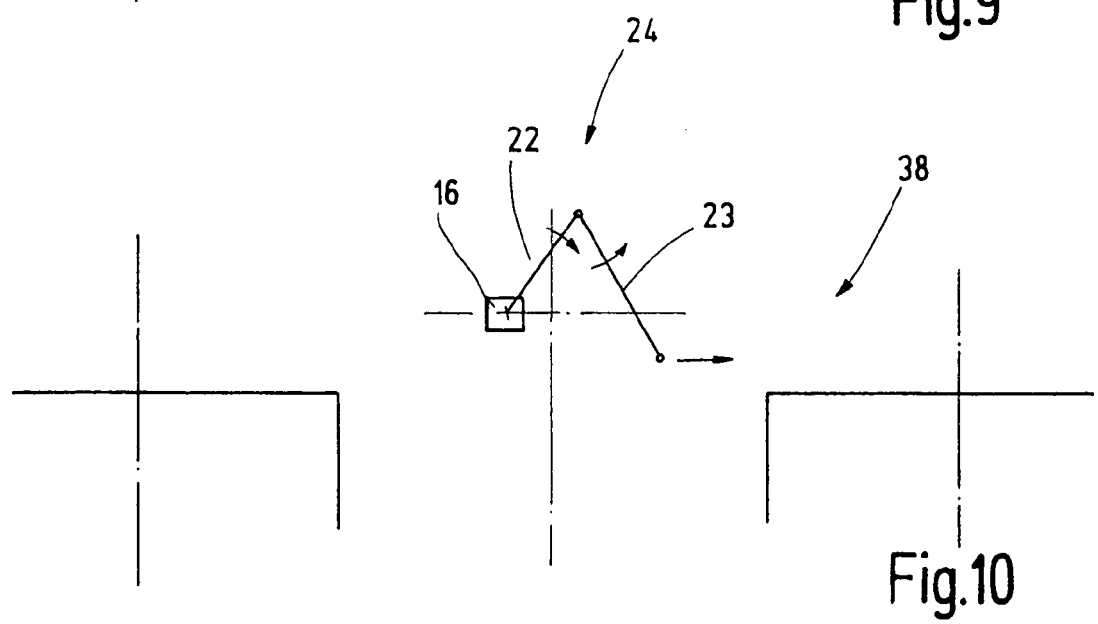
Figure 11:
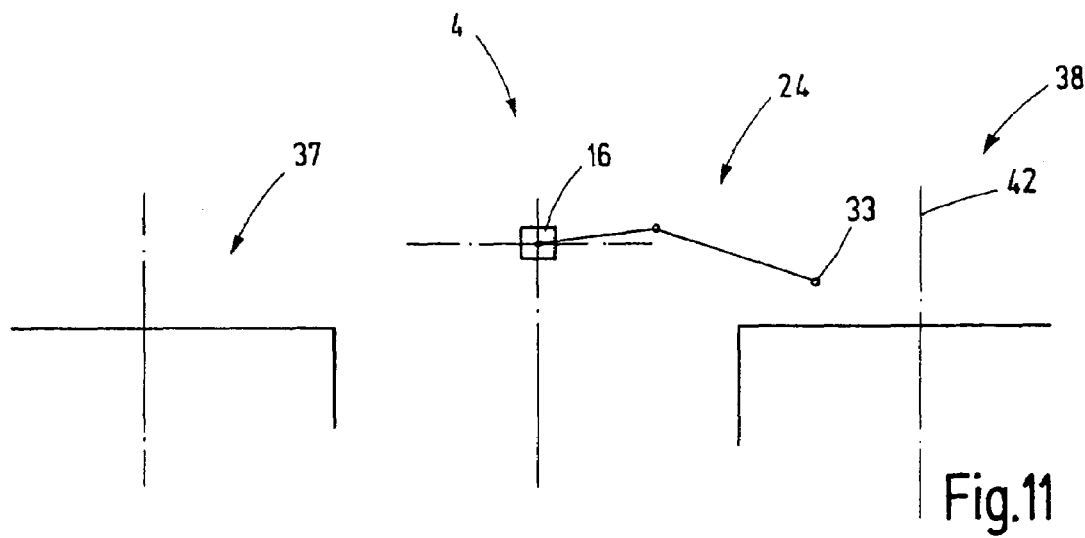
Figure 12:
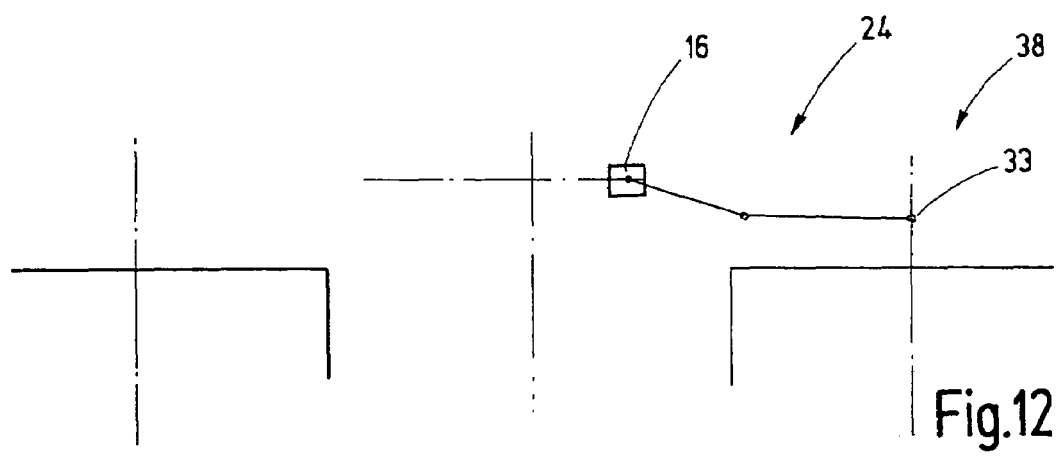
Figure 13:
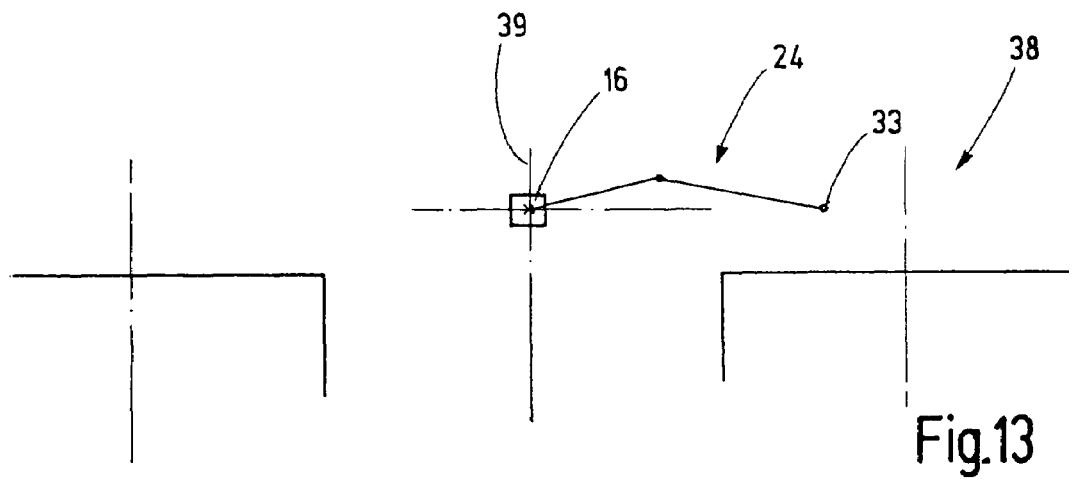

From the left intermediate position as shown in FIG. 10 and in FIG. 19, the carriage 16 is then again moved toward the tool 38 after the arm 24 has been essentially stretched toward the tool 38 so that, as shown in FIG. 11, it extends into the open tool 38. The carriage moves the suction bridge 33 with the workpiece with the arm 24 stretched out to the tool center 42 while it is decelerated. The deceleration of the suction bridge 33, the workpiece supported thereby and the arm 24 is then again provided by the drive for the carriage 16. The workpiece is then deposited in the tool which is closing while the stretched out arm 24 is moved back out of the tool 38 as the carriage 16 is moved back preferably beyond the center line 39.

As indicated in FIG. 18, the speed of movement of the carriage 16 can become negative in the center area that is the carriage moves backward as shown also in FIG. 19. FIG. 17 relates to an embodiment wherein the speed of the carriage 16 during the flipping over of the arm in the transfer from FIG. 9 to FIG. 10 is only reduced and its direction of movement is not reversed. Such an intermediate speed reduction on the way from the end point A to the end point B still provides for a load reduction of the servo drives of the arm. It may be used for example if the presses are arranged at larger distances from each other, that is if there are larger travel distances for the workpiece from one press to the other. The speed of the suction bridge remains positive in any case as indicated by the dashed line III; it is always positive, also in the center area between the presses.

Figure 14:
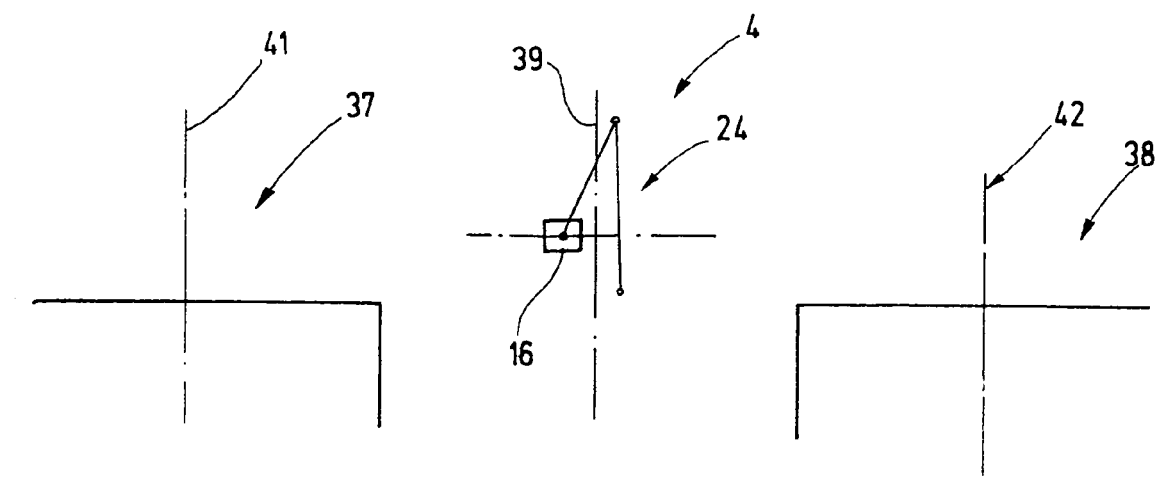
Figure 15:
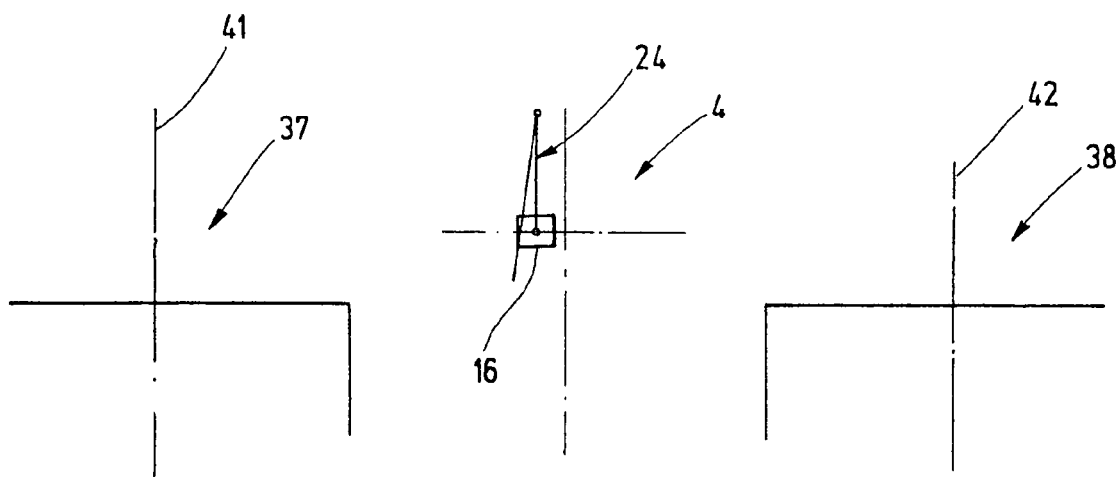
Figure 16:
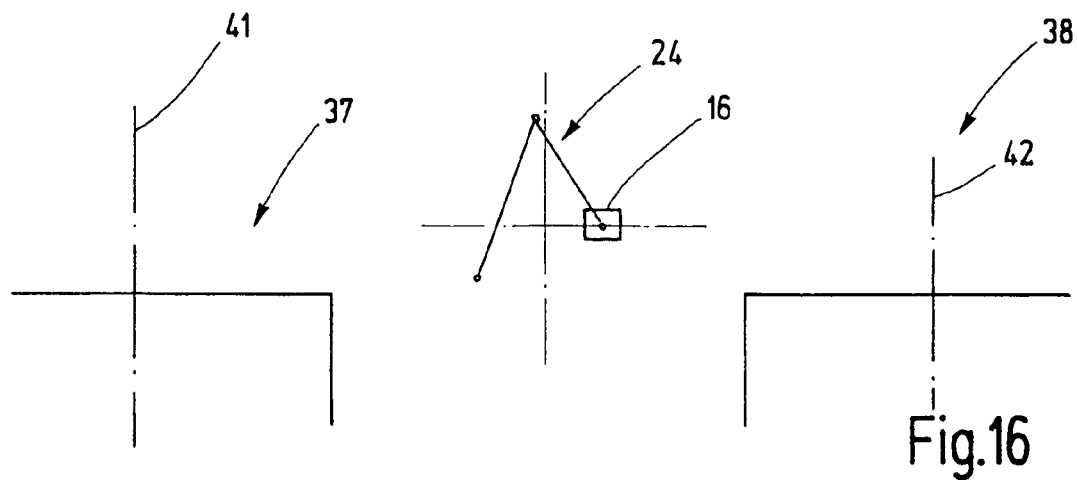

After completion of the transfer stroke, the suction bridge 33 and the arm 24 are moved out of the closing tool 38, while the arm 24 is stretched whereby the carriage 16 again moves past the centerline 39 as shown in FIG. 14 and is decelerated. The kinetic energy of the arm available during deceleration of the arm 24 can be used to flip the arm over as shown in FIGS. 14 and 15. The carriage 16 is then moved to a rest position nearer to the tool 38 and the arm 24 assumes a waiting position in which it is pivoted toward the tool 37. The position as shown in FIG. 16 shows the rest position as it is also shown in FIG. 5. An operating cycle is then completed.

Figure 20:
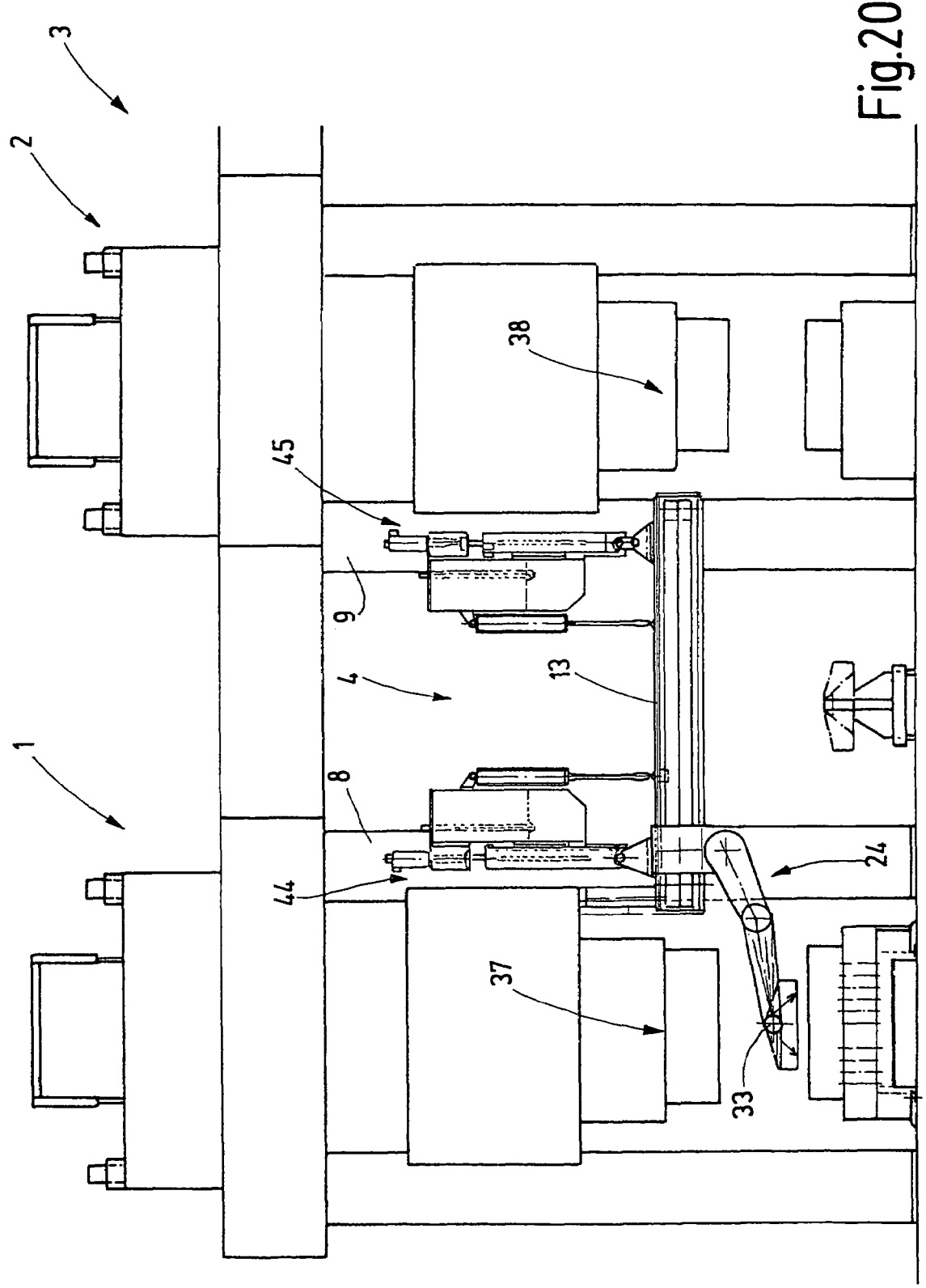
FIG. 20 shows schematically two presses which are interconnected by a transfer arrangement and have additional lift shafts.

FIG. 20 shows an embodiment of a transfer arrangement 4 based essentially on the transfer arrangement according to FIG. 1. Here, however, the guide rails 13, 14 (see also FIG. 21) are height adjustable. To this end, lifting units 44, 45, 46, 47 are provided which support the guide rails 13, 14 together at their ends. The lifting units 44-47 may include weight compensation units (48, 49, 51, 52). The lifting units 44 to 47 like all the other drives of the transfer arrangement 4 such as the servomotors 18, 26, 31, 34 are subject to a central control unit which control at least the transfer arrangement 4. The control unit addresses the various motors in a way that the desired transfer curve is obtained.

Figure 21:
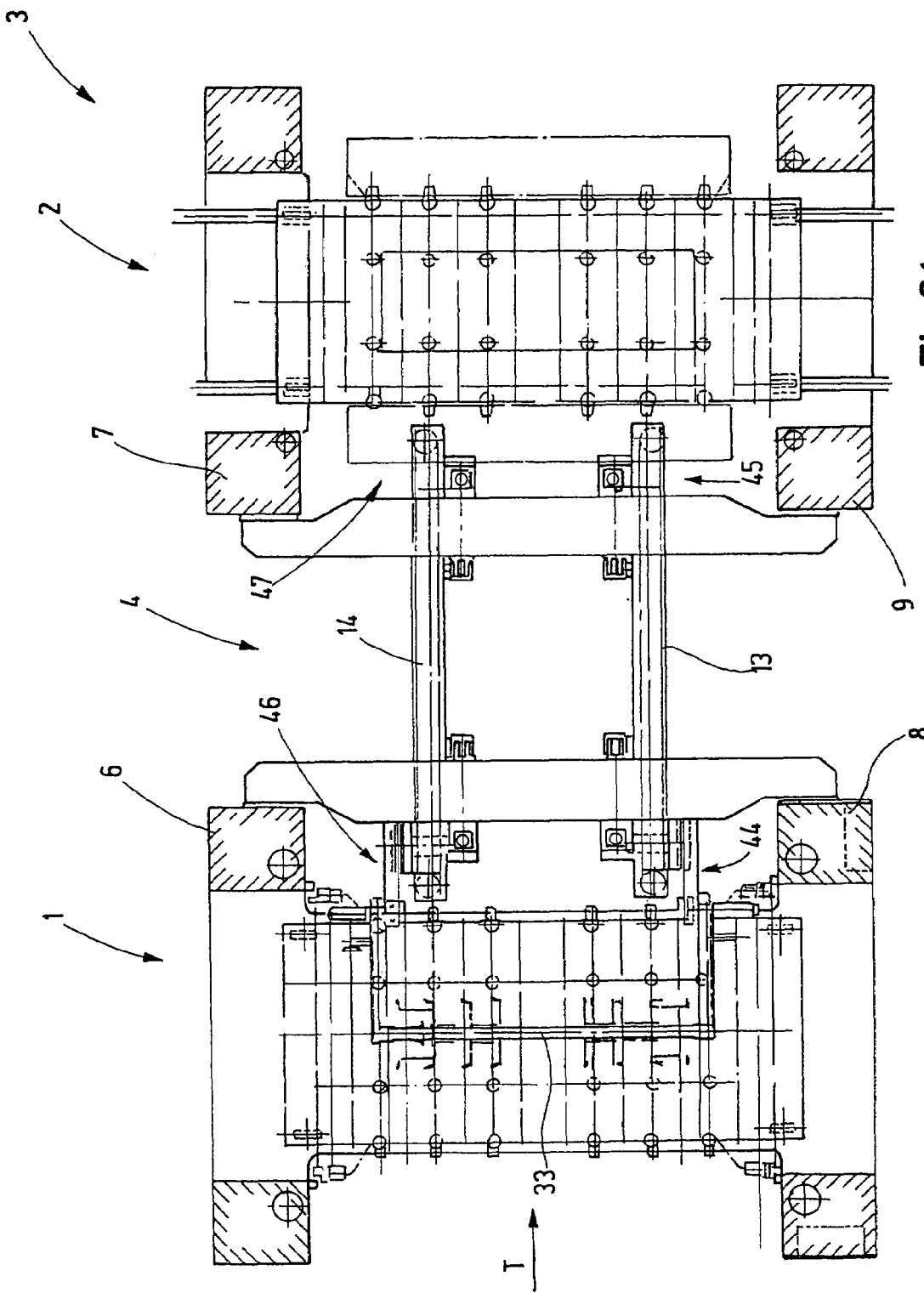
FIG. 21 shows the presses in a horizontal cross-sectional view.
Figure 22:
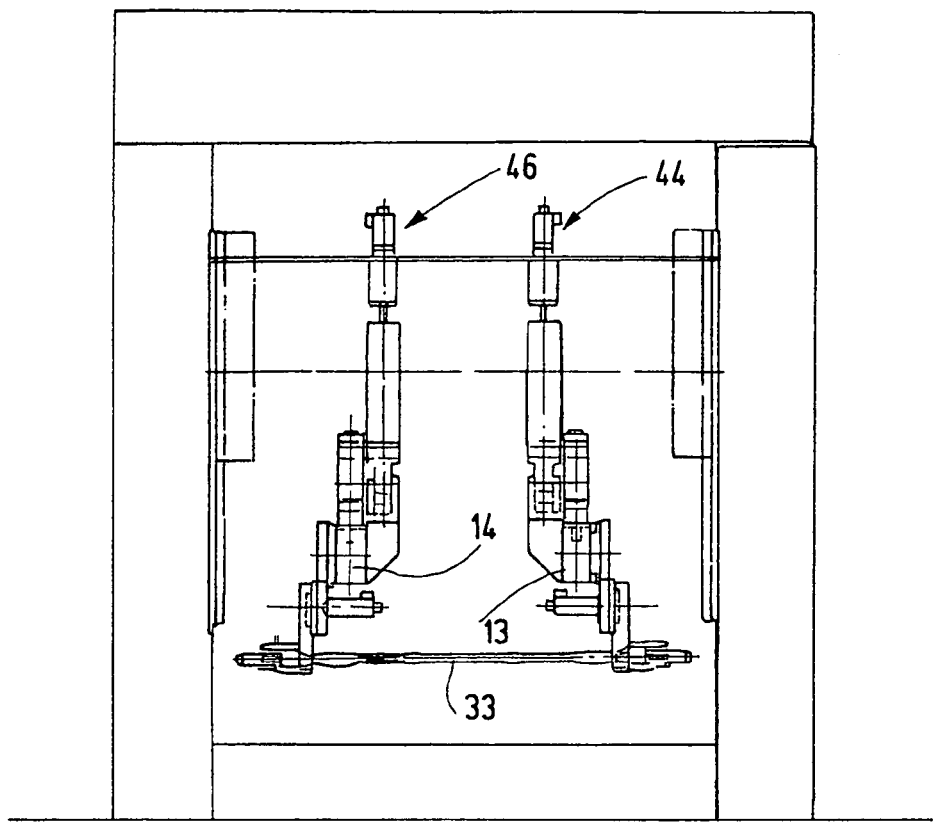
FIG. 22 shows the presses of FIG. 20 as seen in the transport direction.

The lifting units 44, 45, 46, 47 can be controlled synchronously in pairs so that the guide rails 13, 14 are raised or lowered while remaining in a horizontal orientation. However, the guide rails 13, 14 can also be raised or lowered independently of each other. In this way, the workpiece can be tilted in a transverse direction also in the center position between the two presses 1, 2. In addition, the orientations of the guide rails 13, 14 can be adjusted other than horizontally if needed. As shown in FIGS. 21 and 22, the units supported on the guide rails 13, 14 are arranged mirror symmetrically. But their movements do not need to be synchronized. By controlling the two units differently, the suction bridge 13 can be pivoted or inclined with respect to the horizontal longitudinal direction (transport direction T), with respect to the transverse direction and with respect to the vertical direction.

Figure 23:
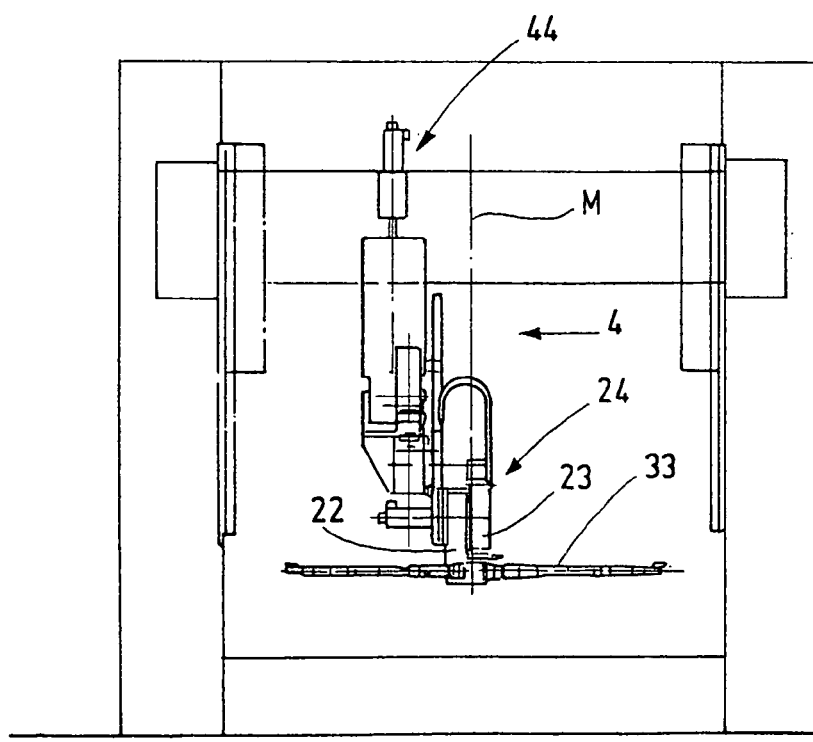
FIG. 23 shows an alternative embodiment of the transport arrangement also the transport direction.

FIGS. 23 and 24 shows a simplified and presently preferred embodiment of the transfer arrangement 4, wherein only a single guide rail 13 is used. The guide rail 13 is arranged outside a center line 53, which, in the transport direction T, extends in the center between the pair of columns 6, 8 and 7, 9. This guide rail 13 is again supported by lifting units 44, 45. In a particular embodiment, the columns can be omitted. However, generally, when present they are adjustable by the control unit for the adjustment of the transfer arrangement 7 which is possible thereby also during operation of the presses. The suction bridge 33 is supported at the center thereof by the element 23 of the arm structure 24. The joint provided at the support includes at least one pivot axis and a control motor for rotating the suction bridge 33 around its longitudinal axis with respect to the element 23 of the arm 24. Other pivot structures with the respective drive motors may be provided. The advantage of such an arrangement resides in the small numbers of control motors required while providing a large degree of freedom of movement and pivotability of the suction bridge 33. Any pivot position of the workpiece can be maintained during the transfer step without the need for adjusting guide rails 13 or 14 as it is required in connection with the other embodiments.

It is apparent from FIG. 23 that the suction bridge is preferably supported in the center thereof and the transfer arrangement 4 is arranged at one side of the center plane M.

The explanations given with respect to the earlier figures supplement the description concerning the embodiments shown in FIGS. 23 and 24.

What is claimed is:

1. A transfer arrangement for transferring a workpiece in a transfer direction between first and second spaced locations (starting point 41, end point 42), comprising: at least one guide rail (14) extending along the transfer direction, a carriage (16) movably supported on the at least one guide rail (14), a carriage drive (17) for moving the carriage (16) back and forth along the guide rail (14), a transfer arm (24) comprising first and second pivot elements (22, 23) the first pivot element (22) being pivotally supports on the carriage (16) and the second pivot element (23) being pivotally connected with one end to the first pivot element (22) by a pivot joint (27), a workpiece holding means (33) attached to the other end of the second pivot element (23) for moving the workpiece holding means (33) in the transfer direction, and a control arrangement for controlling the carriage drive (17) such that, during the transfer of the workpiece holding means (33) from one to the other of the first and second spaced locations (41, 42), the carriage (16) is at least slowed down, while the workpiece holding means (33) with any workpiece held thereby is continually moved by the transfer arm (24), the carriage (16) being movable during the transfer between a starting point (41) and an end point (42) and the control arrangement accelerating first the carriage (16) together with the workpiece holding means (33) supported by the arm (24) with rearwardly stretched out pivot elements (22, 23), the carriage then being slowed down while the pivot elements (22, 23) are pivoted to continue to move the workpiece holding means (33) ahead of the carriage (16) and the carriage being again accelerated and finally decelerated to a standstill at the end point (42) while the arm elements (22, 23) are stretched out forwardly.

2. A transfer arrangement for transferring a workpiece in a transfer direction between first and second spaced locations (starting point 41 and end Point 42), comprising: at least one guide rail (14) extending along the transfer direction, a carriage (16) movably supported on the at least one guide rail (14), a carriage drive (17) for moving the carriage (16) back and forth along the guide rail (14), a transfer arm (24) comprising first and second pivot elements (22, 23) the first pivot element (22) being pivotally supported on the carriage (16) and the second pivot element (23) being pivotally connected with one end to the first pivot element (22) by a pivot joint (27), a workpiece holding means (33) attached to the other end of the second pivot element (23) for moving the workpiece holding means (33) in the transfer direction, joint drive means (26, 29) for pivoting the first and second pivot elements (22, 23) of the transfer arm (24) relative to each other in a controlled manner and, respectively, with respect to the carriage (16) and a control arrangement for controlling the carriage (26), the first joint drive means (26) for actuating the first pivot element (22), and the second joint drive means (29) for actuating the second pivot element (23) such that, during the transfer of the workpiece holding means (33) from one to the other of the first and second spaced locations (41, 42) the carriage (16) supporting the arm (24) with the workpiece holding means (33) is at least slowed down while the pivot arm elements (22, 23) are pivoted to continually move the workpiece holding means (33), the transfer arm (24) with the pivot arm elements (22, 23) being essentially stretched in one direction of movement of the carriage (16) when leaving one of the spaced locations and in the opposite direction when approaching the other of the spaced locations (41, 42), the carriage (16) being movable during The transfer between the starting point (41) and the end point (42) and the control arrangement accelerating first the carriage (16) together with the workpiece holding means (33) supported by the arm (24) with rearwardly stretched out pivot elements (22, 23), the carriage then being slowed down while the pivot elements (22, 23) are pivoted to continue to move the workpiece holding means (33) ahead of the carriage (16) and the carriage being again accelerated and finally decelerated to a standstill at the end point (42) while the pivot arm elements (22, 23) are stretched out forwardly.

3. A transfer arrangement according to claim 2, wherein the carriage (16) is slowed down in the center area of its travel between point A and point B to a standstill and moved backwardly while the arm element (22, 23) are pivoted to continue to move the workpiece holding means (33) forwardly.

4. A transfer arrangement according to claim 2, wherein the joint drive means (26) and (29) of the pivot arm (24) are operated in an opposite sense of pivoting.

5. A transfer arrangement according to claim 2, wherein the first pivot element comprises an upper element (22) the second pivot element comprises and a lower element (23).

6. A transfer arrangement according to claim 2, wherein the joint drive means (29) for operating the pivot joint (27) interconnecting the arm elements (22, 23) comprises a servomotor (31).

7. A transfer arrangement according to claim 5, wherein the joint drive means (29) comprises a transmission (30) which transmits pivot movement of the upper arm element (22) on the carriage (16) to the lower arm clement (23).

8. A transfer arrangement according to claim 2, wherein the carriage drive (17) is supported on a stationary support structure (14).

9. A transfer arrangement according to claim 2, wherein the guide rail (14) is straight and provides with the carriage (16) a linear guide structure for the workpiece holding means (33).

10. A transfer arrangement according to claim 2, wherein the guide rail (14) is supported by lifting structures (44, 45, 46, 47) so as to be height-adjustable.

11. A transfer arrangement according to claim 2, wherein the workpiece holding means (33) is a suction bridge and the transfer arrangement (4) includes two spaced guide rails (13, 14) which extend along a transfer direction (T) and on each of which a carriage (15, 16) is movably supported, two carriage drives (17) for moving the carriage (15, 16) along the respective guide rails (13, 14) in accordance with a predetermined movement pattern, and two arms (21) one pivotally supported on each carriage (15, 16) and supporting the suction bridge (33) for transferring the suction bridge (33) between the travel end points (41, 42).

12. A method for the transport of workpieces between a starting point (41) and an end point (42) by means of a transfer arrangement including an arm (24) supported with one end pivotally on a movable carriage (16) and supporting at its other end a workpiece holder (33), said method comprising the steps of: accelerating and decelerating the workpiece holder (33) by movement of the carriage (16) by a carriage drive (17) with the arm (24) essentially stretched, out and pivoting the arm (24) while the carriage (16) is slowed down or moved backwardly so as to continually move the workpiece holder (33) during the slowdown or backward movement of the carriage (16), the carriage (16) being moved during the transfer between the starting point (41) and the end point (42) by accelerating first the carriage (16) together with the workpiece holder (33) supported by the arm (24) in a rearwardly stretched-out pivot position, the carriage then being slowed down while the arm (24) is pivoted to move the workpiece holder (33) ahead of the carriage (16) and the carriage being again accelerated and finally decelerated to a standstill at the end point (42) while the arm (24). is stretched out forwardly.

13. A method according to claim 12, wherein the carriage (16) and the workpiece holder (33) are moved during the transfer for a short period in opposite directions.

14. A method according to claim 13, wherein the movement of the workpiece holder (33) and the carriage in opposite directions takes place during a flip-over pivot movement of the arm.

15. A method according to claim 12, wherein, the workpiece holder (33) during movement from a startup point (41) to an end point (42) is only once accelerated arid again decelerated.

16. A method according to claim 12, wherein the arm (24) comprises at least two elements (22, 23) pivotally joined to each other.

17. A method according to claim 12, wherein the workpiece holder (33) is moved between two tools which open and close and the workpiece holder (33) is moved into and out of the at least partially opened tools with the arm (24) stretched out.

* * * * *